United States Patent [19]
Elterman

[11] Patent Number: 5,502,516
[45] Date of Patent: Mar. 26, 1996

[54] DISPOSABLE/REUSABLE SUN FILTER

[76] Inventor: Warren B. Elterman, 200 Middle Neck Rd., Sands Point, N.Y. 11050

[21] Appl. No.: 212,196
[22] Filed: Mar. 11, 1994
[51] Int. Cl.$^6$ ....................................... G02C 9/00
[52] U.S. Cl. ................... 351/47; 351/44; 351/41
[58] Field of Search ................... 351/47, 57, 44, 351/51, 52, 45, 46, 158, 41

[56] References Cited

U.S. PATENT DOCUMENTS

| | | |
|---|---|---|
| 1,348,713 | 8/1920 | Gitterman . |
| 1,938,734 | 12/1933 | Withrow . |
| 1,968,193 | 6/1933 | Einson . |
| 2,443,918 | 8/1946 | Lahousse . |
| 2,511,329 | 6/1950 | Craig . |
| 2,759,394 | 8/1956 | Evans ........................ 351/47 |
| 3,033,359 | 5/1962 | Mercer . |
| 3,516,720 | 6/1970 | Mauer . |
| 3,922,464 | 11/1975 | Silver et al. . |
| 4,958,923 | 9/1990 | Rosenson ..................... 351/51 |
| 5,262,216 | 11/1993 | Popat et al. . |

Primary Examiner—William L. Sikes
Assistant Examiner—Hung Xuan Dang
Attorney, Agent, or Firm—Ladas & Parry

[57] ABSTRACT

A light shield is provided which includes a relatively thin but preferably rigid body of light permeable material. An arrangement is interposed between the body of light permeable material and one side of the lens to mount the shield directly on the lens in light intercepting relationship relative to the eye of a user of the lens. The shield which is preferably mounted in generally cantilever manner on the lens is removable and can be reinstalled repeatedly. Preferably an adhesive is used which provides for a minimum of residue on the lens and the shield is preferably affixed to the lens in such a way that there is a minimum of optical interference. The shield can be such as to strip out ultraviolet rays, infrared light or otherwise modulate the light transmitted therethrough. The shield may also be of a form which provides prescription corrections of an optical type. The connecting structure interposed between the body of light permeable material and the ocular lens may take the form of a strip which is rectilinear, arcuate or the like in shape or may alternatively be constructed in the form of pads or islands arranged peripherally relative to the surfaces of the lens and the shield. Permanent posts can also be used.

26 Claims, 5 Drawing Sheets

DISPOSABLE/REUSABLE SUN FILTER

FIELD OF INVENTION

This invention relates to light shields adapted for use with ocular lenses or the like and to methods pertaining to the manufacture and use .of light shields related to ocular lenses and the like.

BACKGROUND OF THE INVENTION

In researching the novelty of my invention preparatory to filing a patent application therefor, I became aware of the following U.S. Pat. Nos.: 1,348,713; 1,938,734; 1,968,193; 2,443,918; 2,511,329; 3,033,359 and 3,516,720.

K. R. Gitterman shows in U.S. Pat. No. 1,348,713 the utilization of an eyeshade in conjunction with an eyeglass lens. The shade is peripherally held by a frame in face-to-face relationship with the associated lens. Clips are employed in the form of hooks to hold the shade on the lens for protecting the related eye from bright lights and sunglare.

M. M. Einson shows in U.S. Pat. No. 1,968,193 transparent flexible oculars fastened to a frame by a pair of elastic loops. No relationship is shown as between a lens and a light shield.

In U.S. Pat. No. 1,938,738, R. Withrow reveals a filter in the form of a pliable sheet. This sheet includes a suitable light filtering material carried by a sheet of relatively inexpensive base material which is pliable and has a fair degree of mechanical strength. It is provided in packs or rolls to be used as required. This patent does not reveal how the light filter is mounted relative to a frame or any other object. Appropriately dimensioned, this filter might be used in conjunction with the present invention but is not anticipatory thereof.

Similarly, in U.S. Pat. No. 2,443,918, J. P. Lahousse shows a plastic sheet material based on cellulose derivatives for the purpose of diffusing light. A new method is revealed for obtaining cellulose derivatives for the specified purpose. However, nothing is revealed with respect to the mounting of the sheet material disclosed which would be useful in connection with the problems solved in accordance with the present invention.

E. Craig discloses in U.S. Pat. No. 2,511,329 a lens cover in the form of a thin sheet or film that is readily adhered to a spectacle lens and which can be removed therefrom. The shield which is formed involves a sheet of thin flexible transparent material and a film of adhesive on one side of the sheet. The Craig patent speaks of separate sunfilter lenses which are affixed by a coating of an adhesive substance on one entire side of each spectacle lens. Optimum clarity of vision through such an adhesive substance is not achievable, nor is the handling of a sticky lens practical. The handling tab provided on the sunfilter lens apparently intended to meet this difficulty does not do so and creates an aesthetically objectionable look. The presence of so much adhesive would also attract dust and dirt to reduce vision and mar the surface of the associated prescription lens. The materials described for the sunfilter itself are described as being thin or paperlike and preferably elastic or constituted by cellophane. Such materials are problematic with respect to handling and their potential for creasing and causing distortion in use, thereby affecting the clarity of vision so important to eyeglasses and the like.

S. N. Mercer describes in U. S. Pat. No. 3,033,359 a lens shield which is adhesive free, self-adhesive by virtue of being made of an electrostatic-type material and is tinted to reduce glare. The Mercer patent provides a self-adhering disposable lens shield constructed of an electrostatic type of transparent plastic such as "Saran-Wrap". By reason of the electrostatic nature of this material it adheres to the associated eyeglass lens when placed in contact with the same. It is clear that the flexible nature of the material will cause it to wrinkle and form bubbles with the associated lens which will interfere with the view that the wearer will have through the lenses of a pair of eyeglasses so protected. Also the shield is of one flexible sheet of transparent material in the shape of two lenses and the bridgepiece of a pair of eyeglasses, all as a single shield.

In U.S. Pat. No. 3,516,720, P. Mauer discloses a reflective film of gold and copper which can be coated directly on a transparent substrate to be associated therewith. It does not appear that this is an eye shield proposal which can be readily employed in circumstances other than those provided for the special application of the reflective film disclosed therein. It cannot be readily removed and reinstalled.

DESCRIPTION OF INVENTION

It is an object of the invention to provide an improved sunfilter for use with eyeglass or ocular lenses.

It is another object of the invention to provide for readily employed sunfilters which are easily disposed of when the use thereof is completed.

It is another object of the invention to provide an improved sunshield which is capable of repeated use in connection with an associated ocular lens.

Yet a further object of the invention is to provide an improved sunshield for use with optical lenses in a manner which does not detract from visual quality and aesthetic appearance.

Yet another object of the invention is to provide an improved lightshield for optical use which can be manufactured and employed at relatively low cost.

Still another object of the invention is to provide an improved relatively inexpensive lightshield which is convenient to market, store and use.

Another object of the invention relates to the provision of an improved lightshield which does not sacrifice vision quality.

A further object of the invention is to provide for the conversion of non-prescription glasses into reading or bifocal eyeglasses.

In achieving the above, and other objects of invention, a lightshield is provided which is adapted for being mounted on at least one side of a two-sided lens. The shield includes a relatively thin but relatively rigid body of shape retaining light-permeable material with means being interposed between this body and one side of the lens to mount the shield directly on the lens in light intercepting relationship relative to the eye of the user of the lens.

The shield is preferably of a material adapted to modulate the strength and/or intensity of light and/or block out certain types of rays intercepted by the shield. The lens will have an area within a determinable range with the shield preferably having an area constituting at least 50% of the lowest magnitude of area in this range. Still further, the shield will preferably be of a material and thickness capable of providing that the shield is self-sustaining in shape.

According to features of the invention, the shield may be provided in planar, concave or convex form. Moreover, according to a preferred embodiment of the invention, the shield will be supported in generally cantilever manner directly on the lens although possibly additionally resting at certain points on the lens.

In accordance with a preferred feature of the invention the shield will be provided with a raised adhesive strip or strips, pad or pads or platform or platforms of limited area permanently affixed to or integral with the shield and containing on the exposed surface, a non-permanent adhesive which will permit affixation of the shield to an associated eyeglass lens. Preferably, the adhesive will be located outside of the effective or major field of vision of the lens so as to not obstruct vision materially.

According to another feature of the invention, the adhesive employed in accordance therewith is of a material adapted to permit ready adhesion and removal of the shield from the lens while leaving substantially no residue thereupon. Moreover, the adhesive will permit ready and multiple removals of the shield from the lens and reinstallations of the shield on the lens.

According to various and respective embodiments, the aforesaid means may be of various shapes and locations, but in the preferred form will be a tapered raised crescent-shaped or substantially rectilinear, possibly scalloped strip positioned along the upper inner surface of the shield, crescent-shaped raised pads positioned at the left and right corners of the shield (or, if round or oval, at the outer peripheries of the upper left and right quadrants), or a raised round or crescent shaped pad at the upper periphery of the longitudinal centerline of the shield. The aforesaid means may also be of a horseshoe shape to extend along the periphery of the inner surface of the shield and descend downwardly along the left and right edges thereof, or circular or otherwise contoured to run along all or a portion of the inner surface of the peripheries of the shield, or arranged at the apices of a triangle or at the apices of a quadrilateral or the like. The means may alternatively include a plurality of pads or islands arranged in generally linear conformation although other arrangements are possible.

According to still a further feature, all or a portion of the aforesaid means may include at least one post which is integral with the body or with the lens. Furthermore, the above-mentioned body may be one of a plurality of similar bodies arranged as a stack.

As will be seen hereinafter, the means spaces the body of the shield from the lens at least in part. If there is contact between the body and the aforenoted side of the lens, such contact, in addition to where the means makes contact, will occupy preferably less than 20% of the area of the same. The adhesive force holding the body to the lens may be, as a separate embodiment, of an electrostatic-charge nature.

The body of the sun shield may have a thickness in the order of magnitude of ¼ millimeter to 2 millimeters although a thickness of up to 4 millimeters is possible. Moveover, the means may advantageously be a strip or pad having a thickness of, for example, from ½ to 3 mm. and a width in the order of magnitude of ⅛ to ⅜ of an inch, but may be greater or smaller depending on the configuration of the means, the size and weight of the shield and the anticipated stresses on the shield.

It is a further object of the invention to provide an improved method of mounting a light permeable shield on an ocular or optical lens in spaced relationship therewith where the means makes contact with the lens and possibly at other portions of the lens. The shield may furthermore be mounted directly on the lens according to the method by an adhesive which contacts the lens over less than about 20% of the area of the same.

According to another feature of the method of the invention, the adhesive may be formed as a backing on a strip which adheres thereby directly to a peripheral portion of the lens as noted hereinabove. Alternative to the strip, there may be employed a plurality of pads or islands with an adhesive being formed as a backing thereon on one or both ends thereof.

The above and other objects, features and advantages of the invention will be found in the description which follows hereinafter as illustrated in the accompanying drawings.

Other objects, features and advantages of the invention will be apparent from the detailed description which follows hereinbelow.

DETAIL DESCRIPTION OF THE INVENTION

On many occasions, an individual who wears prescription glasses for daily activities finds himself in need of a pair of prescription sunglasses which was forgotten at home or which was too bulky to carry or in cases in which the individual chose not to make the expenditure for prescription sunglasses. One solution which exists today in the "ready-to-wear" market is constituted by clip-on sun shields which are fairly expensive, when viewed as a temporary alternative to the prescription sunglasses left at home. They are also inconvenient to carry. More importantly, however, the known clip-ons are generally poor-fitting devices because the closepin-type or paperclip-type clamps thereon do not fit properly over the lens (or bridge) of prescription glasses on which the clamps are to be mounted. This results from the fact that prescription lens and frames are of varying thicknesses, configurations and materials. Further, the clip-ons often sit asymmetrically on and at an unacceptable distance from an individual's prescription lens. Moreover, blind spots occur such as when the clamps protrude down along the prescription lens. As a consequence of these factors, vision quality and aesthetics are not good. In addition, known clip-ons are not satisfactory because of the diversity of models necessary to allow a consumer to choose anything close to a reasonable fit.

Inclusive of the above, the factors of (i) cost, (ii) convenience, (iii) proper fit, (iv) vision quality, (v) style, and (vi) ease of purchase have limited the market for clip-ons. The consumer is thus deprived of significant benefits, both in terms of eye comfort and, as more recently understood, eye health due to the effects of UVA and UVB rays, when for any number of reasons his prescription sunglasses are not available.

The invention meets these needs in a simple but useful way. For example, the invention provides, in accordance with one aspect thereof, preshaped individual concave and/ or convex sunfilter shields (generally used in pairs) made of rigid but relatively thin plastic or other suitable material with a raised strip or strips of double adhesive backed tape or pads (or other embodiments to be described herein-inbelow) running roughly horizontally along the upper inner or outer surface of the sunfilter lens or placed on the inner or outer surface of each of the extreme peripheries of the upper two quadrants of the shield. One side of the adhesive strip or pad may be permanently attached to the sunfilter lens. The other side of the tape or pad may permit a secure but non-permanent fixing of the sunfilter shield directly to the corresponding lens of the prescription eyeglasses. The non-permanent adhesive of the strip or pad is strong, yet will leave little or no residue on the prescription lens upon subsequent removal of the sunfilter shield. The adhesive will also permit many installations and removals of the sunfilter shield without losing its adhesive quality. Its modest cost will also place it in the disposable category.

The placement of the strip(s) or pad(s) is important to avoid material interference with the normal field of vision. Placement in the manner illustrated herein will achieve minimal interference and facilitates removal. Nevertheless, the illustrated manner of placement of the adhesive strip(s) or pad(s) provides for secure adherence of the sunfilter lens or shield and, because of the thickness of the strips or pads, optimizes the suitability of the sunfilter shield for use with a wide range of prescription lens convexities.

In some areas, the thickness of the raised strip or pad may have the effect of forcing another part of the sunfilter shield against the prescription lens. The smaller the spacing that is provided between the sunfilter lens and the prescription lens, the better will be the clarity of vision and acuity through the two. Moreover, the use of a reasonably wide but still non-obstructive strip or set of strips or pads provides excellent stability for the sunfilter shield.

As noted above one configuration of the strip or pad is a crescent-shaped or substantially rectilinear strip (in one version scalloped) running along the inner or outer surface of the upper periphery of the shield. An alternative is a horseshoe-shaped or semi-circular strip framing the top and upper inner or outer surface peripheries of each shield. The strip may also be circular or substantially circular and run the entire periphery of such surface of the shield. Such shapes permit proper adhesion to the prescription lens or its frame in cases where it is desirable to minimize the width of the strip or pad or for other circumstances. Such adhesive strips or pad arrangements can also be scalloped for good aesthetic and mechanical strength purposes or arranged in other positions on the sunfilter shield as long as there is only minimal, if any, obstruction of the field of vision.

Another alternative to an adhesive strip or pad is a set of small adhesive pads or islands configured on the sunfilter shield in such a way as to insure good adhesion and lens stability while at the same time minimizing obstruction of vision. One version of this alternative is the placement of two adhesive strips or pads at the upper left and right corners of the sunfilter shield (or if round or oval, the outer peripheries of the upper left and right quadrants) or a round or crescent-shaped pad at the upper portion of the longitudinal centerline of the shield. Still another configuration would involve a plurality of pads arranged at the apices of a triangle or quadrilateral. The depth of the pads provides for adhesion to various convexities of prescription lens. The pads can be placed to minimize obstruction of vision. Obstruction is principally a factor when pads are placed in the lower as opposed to only the upper portion of the lens.

The sunfilter shield can be made in a wide variety of shapes and colors (normal and vibrant colors as well as metallic silver and so forth) to permit not only functional benefits of the invention but also stylistic effects. Such effects can result from overlaying a larger (or even smaller) sunfilter lens on a smaller (or larger) prescription lens or even a lens of a different shape to achieve a certain aesthetic look. A variety of fashion colors would make it possible to match different clothing or other accessories to achieve different looks or moods.

The subject invention is well-suited to various outdoor as well as indoor uses including driving uses, boat uses, skiing uses, beach uses, park uses, spectator and participation sports uses, as well as other activities.

The invention permits the easy conversion of prescription non-tinted lens into tinted glasses or sunglasses and back again. It also permits changing the color or darkness of existing sunglasses, whether prescription or not. Moreover, because plastic lens are susceptible to scratches, the low cost permitted by the invention would allow ready replacement. The novelty of the users ability to change sunshield colors easily at minimal cost and the interactivity in the placement and removal adds another interesting and useful dimension to the invention.

The adhesive strips or pads referred to above would be coated on the side to be affixed to the prescription lens with a non-permanent adhesive substance such as that made or used by 3M for its double adhesive "Removable Mounting Squares", its "Post-It" squares, or its colors tabs. The adhesive used or made by Anchor Wire Corp. or by Elco Industries, Inc. of Goodlettsville, TN 37072 in its double adhesive Mounting Tape, or those adhesives supplied by Precision Packaging Products, Inc. under the name EZE-STICK, or others, can also be used. Whatever non-permanent adhesive is used should permit easy removal and be a low or non-residue material. It should further be non-marring, non-messy and reasonably durable. The adhesive should perform well (i.e., maintain its adhesiveness and the above enumerated qualities) in a wide rage of outdoor temperatures, as well as in a wide range of sunlight, moisture and wind conditions. Such adhesives today are commercially available. The other side of the adhesive strip or pads will be permanently affixed to the sunfilter shield with a permanent-type adhesive available from Precision Packaging Products, Inc. or others or by being integral with the shield or lens.

The material of the strip or pads includes polyethylene, polyfoam, or other types of foam, felt, silicone or other semi-soft/semi-rigid compressible materials to allow distancing of the sunfilter lens from the prescription lens at the upper portion of the lens or elsewhere where the strip or pads may be placed. The materials of the above-mentioned Mounting Tape or the Removable Mounting Squares are examples of suitable materials for the strips or pads.

The strips or pads may also be made as part of the sunfilter shield itself, being then of the same plastic or other shield material. This raised portion of the lens will then be coated with the non-permanent adhesive which will permit affixing and removal, as in the case of the adhesive strips or pads, to the prescription or optical lens.

The plastic or other material of the sunfilter shield referred to above can be made in concave form (on the side fitting over the prescription or optical lens) and/or convex (on the other side) and is preferably rigid. The shield can be made in a variety of thicknesses. An alternative embodiment of the sunfilter lens or shield, however, would be a treated shield entirely made of an electrostatic acrylic or other electrostatic material. Such material would cling directly to each lens of the prescription glasses. Its thickness would be such that it would not wrinkle upon application and it could be contoured to permit its application to a convex lens. The material would be of a thickness in the range of about ¼ mm. and would be applied easily onto the associated lens.

An alternative means for the attachment of the sunfilter shield would be the use of the electrostatic properties of a raised strip or pad(s) permanently attached to the inside top portion or other areas of each sun filter shield as in the case of the adhesive strip(s) or pad(s) but with the exposed portion of the strip having electrostatic properties to permit it to adhere to the prescription or optical lens.

An alternative to the convex shape of the sunfilter lens is a flat lens of limited flexibility. Such a lens would need to be further distanced by the strip(s) or pad(s) (i.e., by greater depth of the strip(s) or pad(s)) to allow the lens to lie relatively parallel to the prescription lens. Flexibility would permit, as in the case of a pre-shaped convex lens, some contouring of the sunshield laterally because of some pre-shaping laterally or because of the bonding of the sunfilter shield to the prescription or optical lens by the adhesive or electrostatic strip(s) or pad(s).

The appearance of the outline of the strip or pads from an on-looker's perspective could be minimized by the narrowness of its width and the coloration or relative transparency of the strip or pads and of the sunfilter shield itself. There is preferred a darker shade of the sunfilter color in the area of the strip(s) or pad(s) to camouflage the outline. Alternatively or additionally, a tradename, corporate name, logo or other marking could be imprinted so as to appear at the top of the sunfilter shield in front of the strip(s) or pad(s) located in that position.

The thickness of the strip(s) or pad(s) can be selectively varied, although a suitable thickness would be in the order of ½ mm. to 1 mm. and up to 3 mm., with, in the case of a strip (or lateral pad), a width in the order of magnitude of about ⅛ to ⅜ of an inch and a length sufficient to extend across the top of the sunfilter (lens) shield or other areas of placement as described above. The thickness of the sunfilter shield is preferably in the order of magnitude of about ¼ millimeter to 2 millimeters, although a thickness of up to 4 millimeters may be useful. The above dimensions, while being preferred, do not limit the scope of the invention. Different dimensions, placement, or shapes of the strip(s) or pad(s) may also be appropriate for aesthetic reasons. Different lens weights or configurations may further be useful for different purposes as long as the appropriate functions are provided.

Another purpose of the invention is the protection of prescription and optical lenses to avoid their being marred or damaged in certain commercial, industrial or recreational environments. Thus, the invention can provide an inexpensive and readily available shield-like protection in such applications.

For packaging and preservation prior to first use, the exposed surfaces of the strip or pads are preferably covered with a protective coated paper, film or other material employing a silicone release system or other system such as that used with the 3M, Anchor or Elco products mentioned above. This material can be peeled off to expose the adhesive or electrostatic surface just prior to affixation. An alternative would be to allow some similar material to be used for or as part of a backing card as part of the packaging which is employed.

A measuring diagram can be printed on the front of the packaging or the sunfilter shield itself could be used (while packaged in shrink wrap plastic, for example) to allow a potential customer to measure his or her prescription lens' shape and convexity against the contours of the sunfilter lens in the package. All that a customer would need to do for this purpose would be to place the lenses of his or her prescription glasses over the diagram on or actual shape of the sunfilter shield contained in the package. Some other simple set of diagrams or measuring device (e.g., a three point device used to measure concavity by opticians) might alternatively be placed on the packaging or in a rack display. The color of the shield can also be indicated on the packaging.

When not in use, after removal, the sunfilter shield could be affixed to any semi-rigid material, such as an eyeglass case, to the vinyl on the dashboard of a car or returned to a packaging card, or placed shield-on-shield with the respective inner surfaces contacting each other with the adhesive strip or pad of one making contact with a nonadhesive portion of the body of the next adjacent shield. The material to which the sunfilter shield is affixed between uses should not allow large amounts of fiber or dust to attach to the adhesive or electrostatic material.

Because of its low cost, and potential for compact packaging, either in a lens-on-lens or side-by-side configuration or in packs of multiple pairs of lens (with single or multiple colors or shapes or both), the potential exists for wide availability at drugstores, supermarkets, card shops, stationary stores, luncheonettes, discount and general merchandise stores, sports stadium concessions, optical stores and the like or even from vending machines. Such outlets would be particularly desirable at or near sports arenas or areas, beaches, ski areas, highway or truck stops, and so on. The packages would be suitable for hanging or dispensing from countertop fixture racks.

Further, the low cost of this invention to the consumer will allow a consumer to have many colors, shapes and sizes for whimsical fashion use or for the primary use as a temporary or emergency alternative to prescription sunglasses.

Additional significant outlets for distribution could be through eyeglass professionals such as optical stores, opticians, opthomologists and the like. At the time of delivering prescription eyeglasses to the customer, the professional could supply one or several packages of the subject disposable sunfilter shields, pre-cut to the actual dimensions of the prescription lens being supplied. This could be particularly desirable in cases where a customer might not ordinarily purchase prescription sunglasses, as when additional cost militates against such a purchase.

Another application of interest deriving from the invention is the use of a prescription lens affixed as aforesaid as an overlay to an individual's eyeglasses, whether prescription or not. The overlay would thus change the individual's prescription. An example of this application might be the use of a lens having a magnification or bifocal reading lens in its lower half, such that application of that lens over the individual's non-prescription sunglasses would enable the individual to read the small print of a map, menu or document. Such overlay shields might be distributed directly by an optician at the time of the purchase of prescription glasses or otherwise purchased off the rack, much the same way as magnification glasses are today available without prescription. The ease of affixation by the above referenced adhesive strip(s) or pad(s), the low cost by virtue of there being generally no frames in such use, and the widespread availability for purchase for immediate use with ordinary sunglasses are major benefits of this additional possible application of the invention.

A further application for the subject invention is to allow removable shields for various purposes (light filters, protective shields) to be placed over the lens of optical equipment, such as but not limited to telescopes, field glasses, etc. where other means of attachment are unavailable or undesirable.

The invention thus meets concerns not adequately addressed by prior art in its, (i) minimal cost, (ii) convenience, (iii) proper fit, (iv) vision quality, (v) style, and (vi) ease of purchase.

Figure 1:
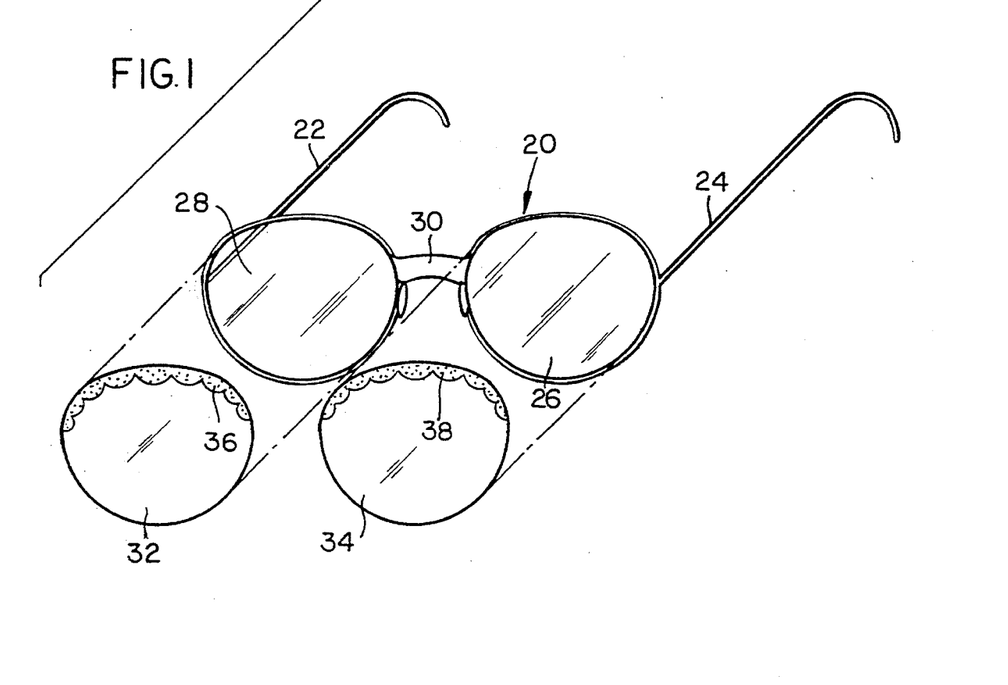
FIG. 1 is an exploded view of a pair of spectacles or eyeglasses illustrating how light shields will be mounted on the respective lenses thereof in accordance with the invention.

Referring next to the drawings, FIG. 1 illustrates a pair of spectacles 20 having templepieces 22 and 24 and prescription lenses 26 and 28 or the like mounted in a frame including a connecting bridge 30. FIG. 1 also illustrates independent and separate sunfilter eye shields 32 and 34 which are of a material which will intercept light passing through the spectacles to the eyes of a user and which will modulate the light passing through such as by cutting down the amount of ultraviolet or infrared light or other areas of the spectrum as may be required. As noted hereinabove, the shields 32 and 34 may be employed for other purposes such as for example by preventing dust and wind from passing through to the lenses 26 and 28 and by protecting the lenses 26 and 28 from damage such as scratching or from the depositing of a residue of any type thereupon.

The light shields 32 and 34 are illustrated as having scalloped strips 36 and 38 mounted thereupon. The eyeglass lenses naturally have two sides, an outer side and the inner side which is proximate the eyes of the user. In the illustrated embodiment, the shields 32 and 34 are intended to be installed upon the outer sides of the respective lenses by means of the strips 36 and 38 which are adhered to the shields and which are provided with a non-permanent adhesive backing which permit the shields to be installed upon the lenses 26 and 28 as illustrated more particularly in FIG. 2.

Figure 2:
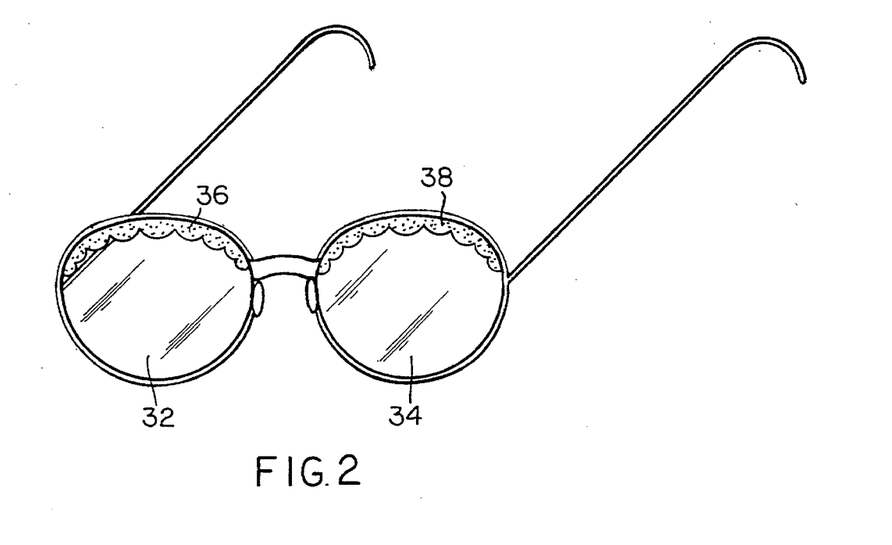
FIG. 2 is a view of the spectacles of FIG. 1 with the light shields mounted directly on the lenses thereof.

In FIG. 2 it will be noted that shields 32 and 34 are mounted respectively on the associated lenses with the strips 36 and 38 occupying peripheral portions thereof. As discussed here-in-above the lenses 26 and 28 have effective fields of vision with the strips 36 and 38 being of such size as to avoid interfering with the respective fields of vision. Where each lens has a determinable range of effective area, the respective shields will be of an area constituting at least 50% of the lowest area in this range. Moreover, the adhesive which connects the strips and thereby the shields to the lenses will preferably contact the lenses over less than about 20% of the area of the same.

The adhesive which is employed to attach the strips and hence the shields to the lenses has been discussed here-in-above. Preferably this adhesive will permit ready installation of the shields upon the lenses and ready removal of the shields from the lenses and will permit repeated use while leaving a minimum of residue upon the associated lenses. Moreover, the adhesive will preferably be light transparent so that, should there be the slightest residue left upon the lenses, there will be no interference with the visual acuity permitted by the same.

Figure 3:
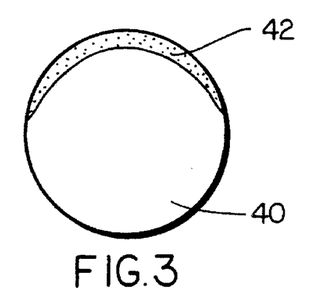
FIG. 3 is a diagrammatic view illustrating a particular arrangement for mounting a light shield on a lens in accordance with the invention.

FIG. 3 illustrates an embodiment of a sunshield 40 wherein the strip 42 is of semi-circular shape. The strip 42 may be provided with a double backing of adhesive in order to adhere to the associated lens and also to adhere to the shield 40 itself. The strip 42 may be of a material of the above noted type but may alternatively be of the same material as that which constitutes the shield 42 and may be integral therewith with the exposed side being coated by an nonpermanent adhesive of the above-noted type. It will be apparent from the illustration that the strip occupies a peripheral portion of the shield 40 and will occupy only a relatively small peripheral portion of the lens to which it will be affixed. Alternatively, the body of the strip 42 may be affixed to the lens and will have an adhesive portion thereon which will be adhered to the shield 40.

Figure 4:
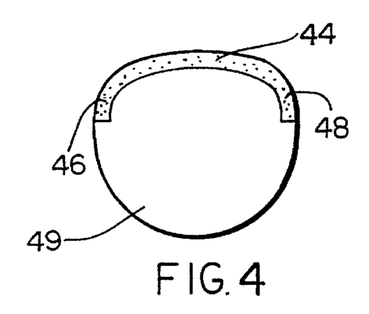
FIG. 4 is a modification of the installation illustrated in FIG. 3.

FIG. 4 illustrates the strip 44 in horseshoe shape having extremities 46 and 48 which will extend down along the lateral peripheries of the shield 49 and as well along the lateral portions of the associated lens. The strip 44 may take any of the forms described above relative to FIG. 3 and will only occupy a relatively small peripheral portion of the lens and shield.

Figure 5:
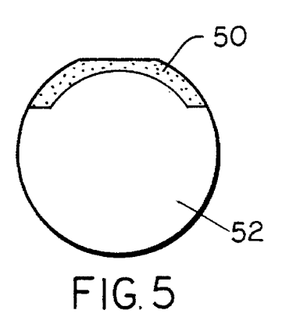
FIG. 5 is a further modification of the installation illustrated in FIGS. 3 and 4.

FIG. 5 illustrates a strip 50 of arcuate shape. As in the aforegoing embodiments, the strip 50 may be of a material having its opposite faces covered with an adhesive in order to be able to stick to the shield 52 as well as non-permanently to the lens to which it is to be affixed. It may also have the other forms indicated above.

Figure 6:
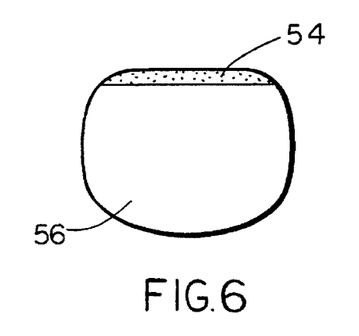
FIG. 6 is a still further modification of the installation for mounting a light shield of the invention on a lens.

FIG. 6 illustrates the strip 54 as being of generally rectilinear shape and as adhering to the shield 56. Once again, the strip may take one of the various forms indicated above by being adhesively affixed thereto or being integral therewith.

Figure 7:
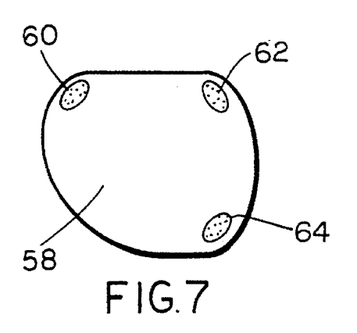
FIG. 7 is a view corresponding to FIGS. 3–6 showing a further embodiment for mounting a light shield on a lens.
Figure 8:
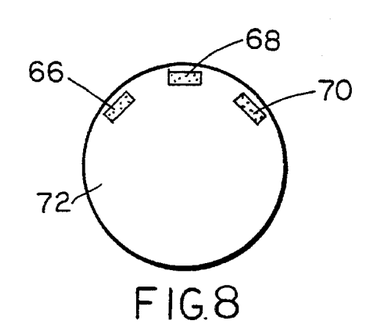
FIG. 8 is a modification of the structure illustrated in FIG. 7.

FIG. 7 illustrates the supporting mechanism of the invention in the form of pads or islands each of which has a body and having its respective faces either permanently or non permanently adhesively affixed to the shield 58. In this embodiment, the pads or islands are indicated at 60, 62 and 64 which may be integral with or attached to the shield 58. It will be noted that these pads or islands are positioned at the apices of an imaginary triangle which is formed thereby. Another triangular arrangement is illustrated in FIG. 8 wherein are shown the pads or islands 66, 68 or 70 attached in triangular relationship to the shield 72.

Figure 9:
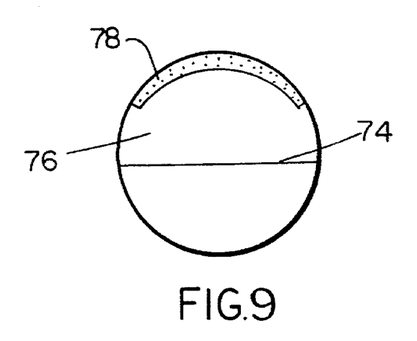
FIG. 9 is still a further modification of a lens and shield combination corresponding to FIGS. 3–8.

The embodiment in FIG. 9 illustrates a clear and bifocal arrangement along line 74 of the shields 76, an arcuate or semi-circular strip being illustrated at 78 to provide for attachment to a lens. This embodiment provides for prescription correction below or above line 74 to operate in conjunction with the associated lens.

Figure 10:
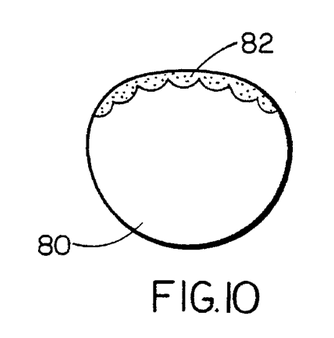
FIG. 10 is still a further modification of an installation of a light shield of the invention on a lens.

In the embodiment of FIG. 10 which illustrates a shield 80, the strip 82 is of scalloped form. In addition to being decorative, this strip permits of additional clear vision relative to a covering of the lens by the shield and strip.

Figures 11, 12, 13, 14:
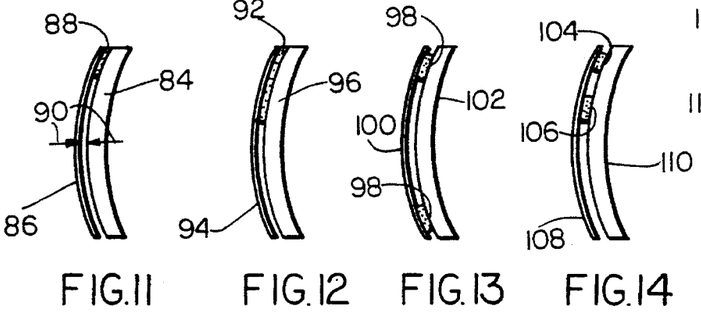
FIG. 11 is side view of a light shield installed in accordance with the invention on a lens.
FIG. 12 is a is a modification of the structure shown in FIG. 11.
FIG. 13 is a modification of the structure shown in FIGS. and 12.
FIG. 14 is a modification of the structure shown in FIGS. 11–13.

In FIG. 11 is illustrated a prescription lens 84 and a shield 86 mounted directly on the glass or plastic of the lens by means of a strip or support 88. The shield 86 is thus mounted in generally cantilever fashion forming a cantilever foundation (with lens contact at various points depending on the respective lens and shield configuration and the concavity/convexity thereof) and is itself concave to receive within its concavity the lens 84. The shield 86 spaced along its entire length from the associated lens as indicated by arrows 90. The spacing is in the order of magnitude, of ½ mm. to 5 mm. with a preferred range of from slightly greater than 0 to 3 mm.

In FIG. 12, the horseshoe shaped strip 92 is of the type mentioned hereinabove. It supports the shield 94 in cantilever relationship with the lens 96 and the shield is spaced from the lens along the entire length thereof as indicated above.

FIG. 13 illustrates one of a plurality of pads such as indicated at 98. This may be according to the two pad relationship illustrated in FIGS. 7 and 8 and involves once again a shield 100 mounted in cantilever fashion directly on a lens 102. The shield may be spaced therefrom along the entire length thereof.

FIG. 14 illustrates a variation of FIG. 13 in that a plurality of pads or islands 104 and 106 are shown supporting a shield 108 on a lens 110 in cantilever manner. In the embodiments of FIG. 12–14, the shields may be regarded as being of concave or convex shape depending on the aspect from which viewed. Provision may also be made to mount these shields on the interior surfaces of the lenses (i.e., on the concave surfaces thereof) so that it is the lens which shields the shield from the elements rather than vice versa.

Figure 15:
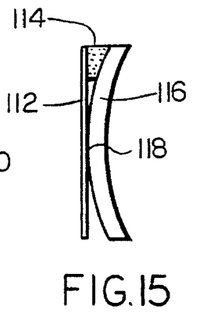
FIG. 15 is a further structure in side diagrammatic view corresponding to FIGS. 11–14.

FIG. 15 illustrates a generally planar shield 112 mounted by a strip or pad 114 on a lens 116. In this case the shield 12 makes contact with the lens 116 as shown at 118 and, while being of generally cantilever type support has some of its surface supported by the lens 116 itself.

Figure 16:
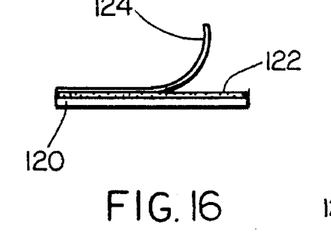
FIG. 16 illustrates diagrammatically an embodiment wherein adhesive on a mounting pad is protected when not in use.

FIG. 16 illustrates that a strip or pad 120 may have its adhesive backed surface 122 protected by a removable sheet of paper or the like indicated at 124 to protect the adhesive surface 122 from collecting lint, dust and other such contamination. The removal of the backing or covering 124 from the strip or pad 120 permits the associated shield (not shown) to be affixed to an associated lens.

Figure 17:
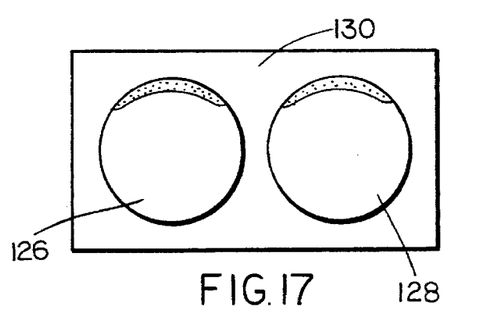
FIG. 17 illustrates diagrammatically one possible mounting of light shields of the invention on a packing card.

FIG. 17 illustrates that two or more shields 126 and 128 can be mounted on a packing card 130 for removal therefrom. The surface of the card 130 can be plasticized or coated with a substance such as silicone or other such substance to permit a ready removal of these shields or filters from the card 130 for application to a lens. Card 130 may be adhesively backed to allow mounting the same for example, on the dashboard of an automobile.

Figure 18:
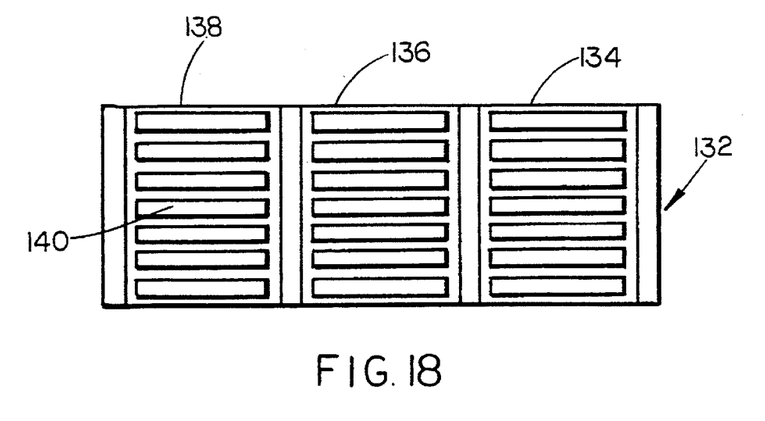
FIG. 18 illustrates a dispenser rack for light shields of the invention.

In FIG. 18 is illustrated a dispenser rack 132 having wells 134, 136 and 138 in which are stacked a plurality of light shields provided in accordance with the invention. The dispenser rack 132 may be employed for purposes of marketing. Such a rack may also be utilized in an automobile or other such vehicle or the like to provided for the ready accessibility of the optical shields, which themselves are indicated for example at 140.

As noted above, the shields are preferably selfsustaining in shape and are provided to cover preferably at least 50% of the area of the associated lens. The shield may be planar, concave or convex and will generally be spaced from the associated lens to avoid any distortion and alteration of visual acuity. The shield is preferably mounted in generally cantilever manner (using a cantilever foundation), although the shield may also be supported at the apices of various quadrilateral or triangular geometrical shapes or the like. In some embodiment the body of the shield may rest on certain areas of the lens such as at the point of maximum convexity. The strips or pads by which the shields are adapted to be connected to lenses are preferably provided with non-permanent adhesive. Adhesive can be provided at one or both sides of the associated strips or pads in order that the shields can be affixed to the associated lenses. As an alternative, and as mentioned above, the connecting mechanism may also and alternatively be permanently integrated with the shield or with the associated lens whereupon a non-permanent adhesive will be applied to the exposed face of such mechanism. Where two adhesives are employed, the stronger more permanent adhesive will preferably attach the associated strip or pad to the shield. The weaker non-permanent adhesive will preferably removably attach the strip or pad to the lens or other supporting structure. The shield furthermore may alternatively be attached to the inside or outside of the associated lens.

In accordance with the invention, where the lenses have an effective field of vision, the connecting mechanism is preferably located substantially outside of this field. The adhesive employed will permit ready and multiple removals of the shield and reinstallations of the same on the associated lens.

The strips or pads or islands are preferably in contact with the associated side of the connected lens over less than 20% of the area of the same. In certain embodiments, the connecting adhesive may take the form of an electrostatic charge. The body of the light permeable shield will have a thickness in order of magnitude of ¼ to 2 mm and up to 4 mm. However, larger and smaller thicknesses may be appropriate under certain more stressful conditions. The connecting means may be a strip or pad having a thickness of ½ to 3 mm. and a width for example in the order of magnitude of ⅛ to ⅜ of an inch. While these dimensions are preferred this should not be regarded as limiting of the invention.

As mentioned above, the invention also contemplates a method. This method will comprise directly mounting a light permeable shield on an ocular lens or the like in spaced relationship therewith relative to at least a significant portion of the lens. The shield is preferably mounted directly on the lens by an adhesive which contacts the lens over less than about 20% of the area of the same as mentioned above. The adhesive may, moreover, be formed as a backing on a strip which is adhered directly to a peripheral portion of the lens, or this adhesive may be provided on a plurality of pads which are also adhered to a peripheral portion of the lens when the shield is to be mounted thereupon.

As has been mentioned here-in-above the shield will preferably be supported in a generally cantilever manner forming a cantilever foundation on the lens. In one of the above embodiments it is shown that the shield can be mounted to contact the associated lens at a position spaced from where the shield is supported on the lens. Such contact will be made over a relatively limited area and can be employed in other embodiments as well.

The shield will generally be made of relatively rigid material as discussed above, capable of ultra violet and possibly infrared interception as well as interception in other areas of the light spectrum. In some embodiments, light modulation for corrective purposes may accompany or replace the control of light strength.

The non-permanent adhesive enables repeated installation and removal of the shield with respect to the lens without the deposit of substantially any adhesive residues on the lens. The adhesive may be formed as a double backing on opposite sides of the strips or pads (one permanent adhesive and one non-permanent adhesive) to be in adhering relationship with the shield and lens. This means that one adhesive will have stronger adhesive qualities than the other adhesive. As described above, the stronger adhesive can be replaced by actually integrating the strip or pad with the shield in the form of one or more posts.

As has been noted, the non-permanent adhesive referred to above may be of a material selected from the group consisting of non-permanent removable or temporary adhesives as used in 3M's "Removable Mounting Squares", "Post-It" Squares or color tabs or in Elco Industries, Inc.'s or Anchor Wire Corp.'s double adhesive removable "Mounting Tape" or other such adhesives having temperature service ranges of at least 10°–120° F. These may include a synthetic rubber or latex based, removable adhesive with low moderate initial tack but having high holding power and removing cleanly with little or no residue, having a service range of at least 0°–120° F., and known as EZE-STIK or Precision Packaging Products Inc. #328.

The permanent adhesive referred to above may be a synthetic rubber or latex based, permanent adhesive with good adhesive wet out, high initial tack, good shear values, high ultimate adhesion having a service range of at least 0°–120° F. and being used on a tape known as EZE-STIK or Precision Packaging Products Inc. #'s 9332, 9316 or 9308 with a tensile strength (lbs/in. width carrier only) respectively at ½2" of 5#–6#, at ¹⁄₁₆" of 9#–10# and at ⅛" of 12#–13#, with an adhesion (oz/in width) of 100 min. (PSTC#1) and a shear of (hrs.) 500+ (PSTC#7).

As indicated above, any of a variety of commercially available pressure sensitive adhesives which are removable without leaving a significant amount of adhesive residue, even after extended exposure to heat and light can be used in practicing the invention. Such adhesives will preferably have a peel force of less than about two (2) pounds. A pressure sensitive adhesive as employed is one which bonds almost instantaneously when contact pressure is applied to force the mating surfaces together. Such adhesives have a cohesive strength such that, if the adhesive is peeled away from a smooth surface to which it has adhered, no apparent offsetting occurs and no appreciable residue remains on the smooth surface. The tack will be relatively non-aggressive and ordinarily will not be sensed until some pressure is applied to the surface of the pressure sensitive adhesive, causing it to 'cold flow' in the manner of most viscoelastic materials. The pressure sensitive adhesive may be applied to the substrate or strip, pad or platform by coating from an organic solvent based solution, coating from a suspension or dispersion such as an aqueous latex, or coating or extruding a hot melt pressure-sensitive composition.

As mentioned, there can be employed an adhesive used in the double adhesive removable Mounting Tape distributed by Anchor Wire Corp. or Elco Industries, Inc. or by Precision Packaging Products, Inc. as #328 and known under the tradename EZE-STIK or used in Minnesota Mining and Manufacturing Company's double adhesive Removable Mounting Squares or in its Post-it squares or tabs.

Pressure sensitive adhesives can be used which are based on organic solvent solutions of natural or synthetic rubber tackified by some type of resinous material. There can also be used removable adhesive as described in U.S. Pat. No. 3,922,464 assigned to Minnesota Mining and Manufacturing Company, St. Paul, Minn. dated Nov. 25, 1975. This adhesive is a stable viscous polymer latex formed from monomers of major amounts of alkyl acrylates, minor amounts of emulsifier monomers, and, if desired, minor amounts of zwitterionic monomers, the water being evaporated from the latex to leave a tacky and pressure-sensitive adhesive. The desirable attributes of the pressure sensitive adhesive include availability in latex form, stability at widely varying temperatures even when subjected to mechanical movement, a high enough latex viscosity to permit a uniform and predictable layer of adhesive to be applied, maximum predictability of characteristics from batch to batch, minimization of staining, and the fact that adhesion does not increase to the point where the pad or platform to which it is applied cannot be removed cleanly. The latex will have a sufficiently high viscosity (e.g., 500–2000 cps) to permit the coating on of a layer which, after evaporation of the water, may range up to 5 mils (about 125 microns) in thickness.

The above described pressure sensitive adhesive may be a copolymer adhesive of monomers, 100 parts by weight of adhesive consisting essentially of (a) 88–99 parts by weight of at least one terminally unsaturated vinyl monomer, (b) 0.2–5 parts by weight terminally unsaturated vinyl monomer, (b) 0.2–5 parts by weight of at least one emulsifier monomer and (c) 0–10 parts by weight of at least one zwitterionic monomer, the total of (b) and (c) being 1 to 12 parts by weight. In one composition, the terminally unsaturated vinyl monomer amounts to 95–98 parts by weight and the emulsifier monomer amounts to at least one part by weight. In such an adhesive, 70–100 weight percent of the terminally unsaturated vinyl monomer is selected from the class of non-tertiary alkyl acrylates wherein each alkyl group has at least half of its carbon atoms in a single chain and the average length of the alkyl chain is more than 4 and not more than 12.

For various reasons it may be desirable to incorporate, as part of the terminally unsaturated vinyl monomeric portion of the adhesive system, any of the several modifying comonomers which are not emulsifier monomers. Acrylonitrile imparts firmness and solvent resistance, styrene and alphamethyl styrene impart firmness and improve peel adhesion, t-butyl styrene improves tack, methylmethacrylate makes the adhesive firmer, octyl vinyl ether softens the adhesive, vinyl acetate improves adhesion to certain plastics surfaces and so forth.

A pressure sensitive adhesive can be used which includes between 45 wt. and 85 wt. % of a copolymer of propylene or ethylene with an aliphatic hydrocarbon having an open chain configuration with between 5 and 7, preferably 6, carbon atoms. The copolymer is preferably amorphorous propylenehexene. The pressure sensitive adhesive also includes liquid and solid tackifiers, and may include U.V. stabilizing and anti-oxidant material. The copolymer consists essentially of an olefinic hydrocarbon of from 2 to 3 carbon atoms and an open chain aliphatic hydrocarbon having from 5 to 7 carbon atoms.

The percentage of the various materials may vary, but for one type of hot melt adhesive, useful ranges of weight percentages for the materials would be as follows:

Copolymer 45%–85%

Solid Tackifier 5%–35%

Liquid Tackifier 4%–24%

Anti-Oxidant 0.1%–2%

U.V. Absorber and Stabilizer 0.05%–1%

For permanent pressure responsive adhesives, higher amounts of copolymer and the solid tackifier can be used, while for removable pressure sensitive adhesives, lower percentages of the copolymer and solid tackifier would be used, with higher percentages of the liquid tackifier.

Instead of hot melt application, the adhesive could also be applied at room temperatures, using solvents such as toluene, methyl ethyl ketone (MEK), ethyl acetate, heptane, or other solvents. The basic composition would be as set forth above, but 30% to 50% of solvent would be employed. Reference is made to U.S. Pat. No. 5,262,216 Nov. 16, 1993 (G. Popat) for a further description of the characteristics of this pressure sensitive adhesive.

The designation "permanent adhesive" is herein applied to adhesives having a peel force in the order of 3 pounds or more, while pressure sensitive adhesives having a peel force of less than about two pounds are referred to as removable (non-permanent) adhesive coatings.

An adhesive substance in the nature of a removable plastic adhesive is also useable such as (but not limited to) that sold under the tradename UHU HOLD-IT and made or supplied by Eberhard Faber, Inc. Oakville, Ontario, Canada L6H 5R6 and Lewisburg, Tenn. 37091 or acrylic adhesive or adhesive of any other material having a light to moderate initial tack with moderate to high holding power and which removes cleanly with little or no residue.

The details of adhesives as referred to herein are not intended to be limitative of the invention but merely illustrative of some forms which would be useful in practicing the invention. Thus, according to some preferred embodiments, the pads, strips or other structures interposed between the lens and shield will preferably have a permanent adhesive on one side and a non-permanent or removable adhesive on the other side (i.e., removable from the lens). In still other embodiments, the non-permanent adhesive can be used on both sides to permit removal of the interposed structure from the shield as well.

Figure 19:
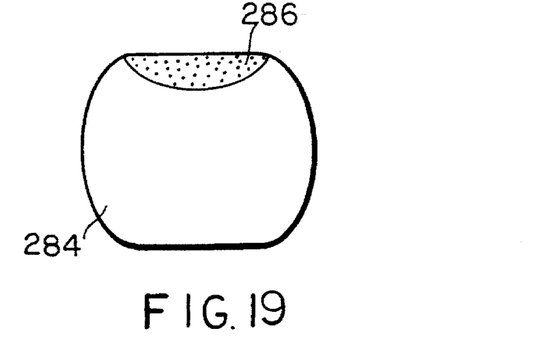
FIG. 19 is a diagrammatical front view illustrating a further embodiment adapted for mounting a light shield on a lens in accordance with the invention.
Figure 20:
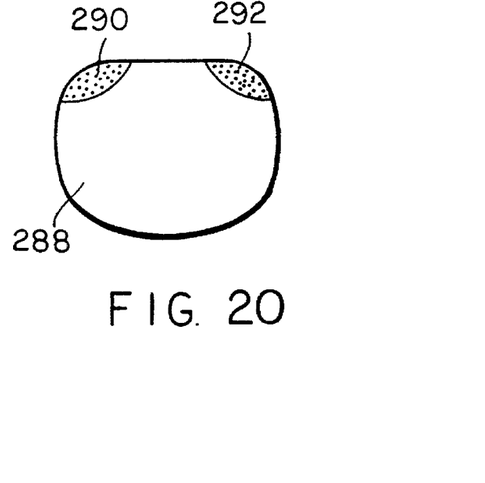
FIG. 20 is still another modification corresponding to the view shown in FIG. 19.
Figure 21:
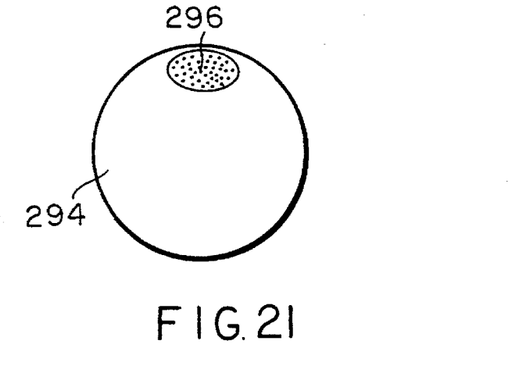
FIG. 21 is still another embodiment of the invention corresponding to FIGS. 19 and 20.
Figure 22:
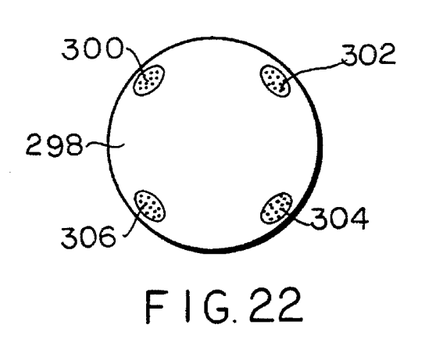
FIG. 22 illustrates still a further modification of the installation of a light shield of the invention on a lens.
Figure 23:
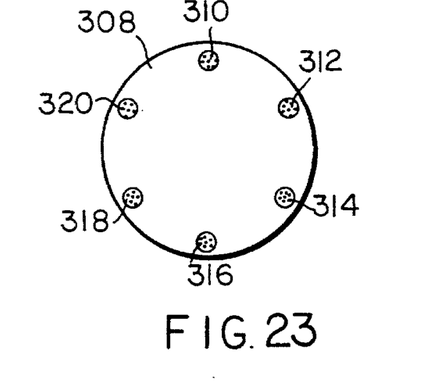
FIG. 23 is a further modification of an installation for mounting a light shield of the invention on a lens.
Figure 24:
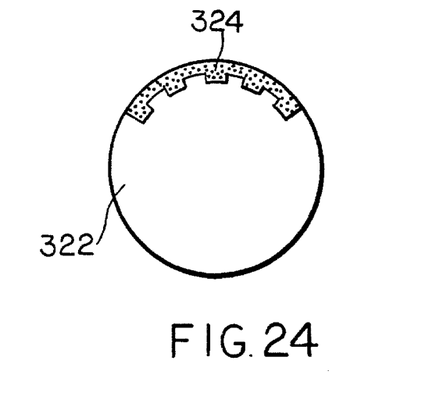
FIG. 24 is still a further modification of an installation for mounting a light shield on a lens in accordance with the invention.

Referring next to FIGS. 19–24, there will be seen other modifications and variations of the invention constituting additional embodiments thereof. In FIG. 19 is illustrated a shield 284 having a strip of arcuate configuration thereupon as indicated at 286. As in the prior embodiments of the invention, the strip 286 will have on its opposite faces adhesives which are preferably of different strengths. Thus, on one side of the strip 286 will be an adhesive which is a nonpermanent or removable adhesive whereas preferably the adhesive on the side bonding to the shield 284 will be a permanent adhesive. FIG. 20 illustrates a shield 288 having two pads or islands 290 and 292. Adhesive will be applied to the opposite faces of these pads as referred to hereinabove with reference to FIG. 19. FIG. 21 illustrates a shield 294 with a pad 296 having adhesives on the opposite faces thereof in the same manner as has been previously described. FIG. 22 illustrates a shield 298 having islands 300, 302, 304 and 306 mounted at the apices of a quadrilateral or square. The adhesive on these pads will preferably be applied as indicated hereinabove. FIG. 23 illustrates a shield 308 having six pads or islands 310, 312, 314, 316, 318 and 320 mounted thereupon for attachment to a lens. It will be noted that, in this embodiment of the invention as well as in the embodiment illustrated in FIG. 22, the cantilever style of attachment is not employed. This adds to the strength of attachment as well as to the maintaining of an appropriate spacing with the associated lens; however, it does interfere with the field of vision to a greater extent than the cantilever style of attachment. FIG. 24 illustrates a castellated form of attachment relative to the illustrated shield 322, the castellated strip 324 being mounted at the upper edge of the shield 322 to effect a cantilever type of support.

Figures 25, 26:
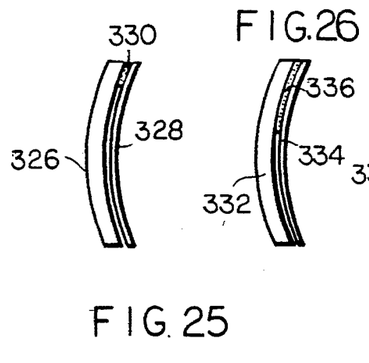
FIG. 25 is a diagrammatic illustration in side view of the combination of a light shield and lens in accordance with the invention.
FIG. 26 illustrates a modification of the embodiment illustrated in FIG. 25.
Figure 27:
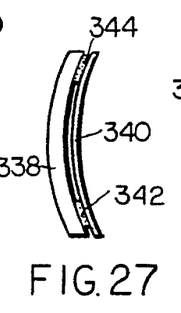
FIG. 27 is a further modification of the embodiments illustrated in the FIGS. 25 and 26.
Figure 28:
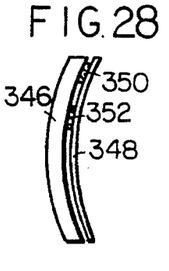
FIG. 28 illustrates still a further modification in side diagrammatic view.
Figure 29:
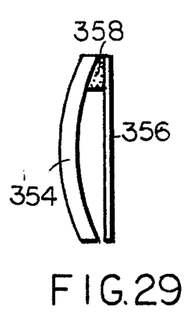
FIG. 29 is a further modification of the mounting of a shield on a lens in accordance with the invention.

Referring next to FIGS. 25–29, there are shown in side view additional embodiments of the invention wherein the shield is mounted in the concavity of the associated lens rather than on the convex side. In FIG. 25 is illustrated a lens 326 with which is associated a shield 328 of the above-noted type there being interposed between the lens and shield a strip or pad 330 having adhesive thereon in the nature of what has been described above. FIG. 26 also illustrates a lens 332 having a shield 334 associated therewith on the concave side of the lens with a strip 336 being interposed between the two in the manner described above. FIG. 27 illustrates a lens 338 having a shield 340 associated therewith with a plurality of pads or islands 342 and 344 interposed between the bens and the shield. In the embodiments of FIGS. 25 and 26, a cantilever type of support is employed. In the embodiment of FIG. 27, the shield is supported at the upper extremity and lower extremity and the cantilever association is not employed. FIG. 28 illustrates a still further embodiment of the invention wherein a lens 346 is associated with a shield 348, there being interposed there-between pads or strips 350 and 352 which modify the type of cantilever support which is employed. FIG. 29 illustrates a lens 354 of concave or convex shape associated with a planar shield 356 supported on the lens by a strip or pad 358. In this embodiment of the invention, the spacing between the shield and lens varies along the vertical extent of the shield 356. Nevertheless, the shield is mounted on the concave side of the lens 354 as in the earlier described embodiments in FIG. 25–28.

Figure 30:
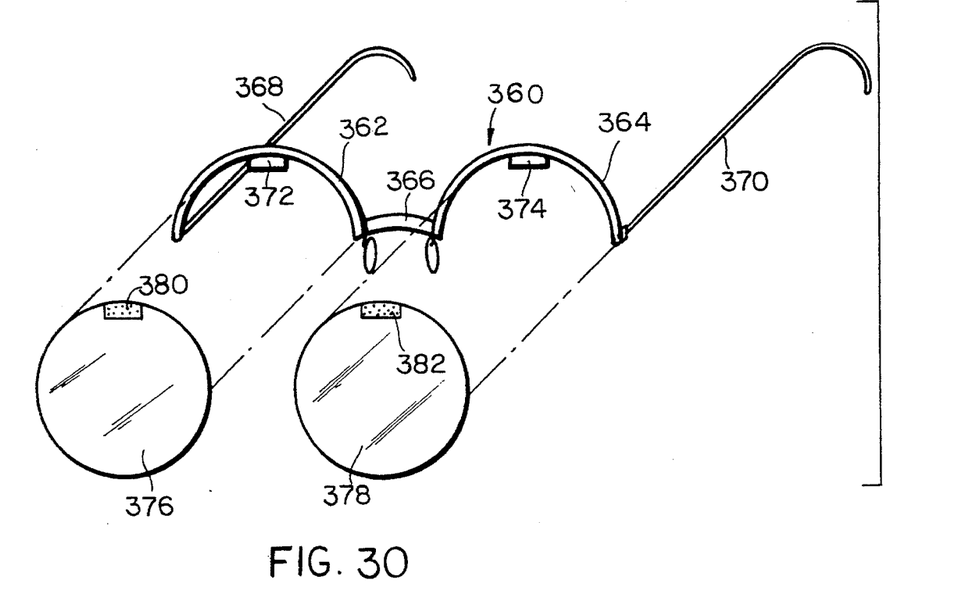
FIG. 30 illustrates in exploded view a further utilization of the invention in the form of a combination of an eyeglass frame and shields.

FIG. 30 illustrates still a further embodiment of the invention in which it is not necessary to employ a lens, the shields in this embodiment being utilized without prescription lenses and for decorative purposes or for sunblocking purposes or the like. In FIG. 30 appears a frame 360 having semicircular rims 362 and 364 connected by bridge 366 and constituting a part of the frame. Also shown are ear or temple pieces 368 and 370. The rims 362 and 364 have platforms or extensions 372 and 374 depending therefrom. It is on these extensions that shields 376 and 378 are mounted by employment of the strips or pads 380 and 382 having adhesive on opposite faces thereof in the form which has been mentioned hereinabove. The extensions would be placed to correspond to the strips or pads on the shields or vice versa.

The shields which have been mentioned throughout this description may be of various materials but are preferably of a shape retaining configuration. The sunfilter shields as used herein may be made of:

1. Acrylics and plastics, such as but not limited to:
   (i) polymethyl methacrylate (sometimes known as "PMMA",
   (ii) Columbian Resin 39 (known as CR 39),
   (iii) ABS Resins composed of acrylonitrile, butadiene and styrene, including methyl methacrylate,
   (iv) polycarbonates, or
   (v) coated acrylics or polycarbonates with silicones or other materials for scratch resistance, including but not limited to polysiloxane resins or other rigid silicones,
2. Glass including that is known as "crown glass", and
3. Other suitable materials or combinations of the foregoing which generally will have the ability to transmit a high percentage of total light.

There will now be obvious to those skilled in the art many modifications and variations of the embodiments of the invention described above both relative to the method and to the product. These modifications and variations will not depart from the scope of the invention if defined by the following claims or if equivalent thereto.

What is claimed is:

1. A light shield adapted for being mounted on a two-sided ocular lens, said shield comprising a relatively thin but rigid body of light permeable material, and means interposed between said body and one side of the lens to mount the shield on said lens in light intercepting relationship relative to the eye of a user of said lens, said means including opposite surfaces and an adhesive on each of said surfaces, said adhesives being of different adhesive strengths, one of said adhesives beings adapted to stick to said shield in relatively permanent manner.

2. A light shield as claimed in claim 1, wherein said body is of a material adapted to modulate the strength and type of light intercepted by the shield and wherein said means includes a strip or pad provided with said opposite surfaces which are engaged by said adhesives.

3. A light shield as claimed in claim 2, wherein said shield is of a material and thickness such that the shield is self sustaining in shape and said strip or pad has a thickness of about ½ to 3 mm. and a width of from about ⅛ to ⅜ inches.

4. A light shield as claimed in claim 2, wherein said means supports the shield in generally cantilever manner on said lens.

5. A light shield as claimed in claim 4 or 8, wherein said strip or pad is at least substantially rectilinear, arcuate or oval in shape and extends along the upper extremity of one side of said body, the strip or pad being of foam, felt or silicone.

6. A light shield as claimed in claim 4, wherein said means includes at least two islands arranged in generally linear, arcuate, semicircular or circular conformation on one side of the shield.

7. A light shield as claimed in claim 4, wherein said means consists of two crescent shaped strips positioned respectively on the outer edges of the upper extremity of said one side of the shield.

8. A light shield as claimed in claim 2, wherein said means supports the shield in the manner of a cantilever foundation.

9. A light shield as claimed in claim 8, wherein said means is at least substantially rectilinear in shape and extends along the upper extremity on one side of the shield body.

10. A light shield as claimed in claim 1, wherein said lens has an area within a determinable range and said shield is of an area constituting at least 50% of the minimum area in said range.

11. A light shield as claimed in claim 1, wherein said lens includes an effective field of vision and said means is located substantially outside of said field.

12. A light shield as claimed in claim 1, wherein said lens includes an effective field of vision and said means is positioned to avoid substantially obstructing said field.

13. A light shield as claimed in claim 1, wherein said one adhesive is adapted to permit ready removal of said shield from said lens while leaving substantially no residue on said lens.

14. A light shield as claimed in claim 13, wherein said adhesive is of a material which permits ready and multiple removals of said shield from said lens and reinstallations of said shield on said lens.

15. A light shield as claimed in claim 1, wherein said means spaces said body from said lens at least in major part.

16. A light shield as claimed in claim 1, wherein said means is in contact with one side of the shield on less than twenty percent of the area of the same.

17. A light shield as claimed in claim 1, wherein said means includes an electrostatic charge holding said body on said one side of the lens.

18. A light shield as claimed in claim 1 wherein said body of the shield has a thickness in the order of magnitude of ¼ to 4 mm.

19. A light shield as claimed in claim 1, wherein said means includes a strip between said body and lens and having a thickness of ½ to 3 mm. and a width in the order of magnitude of ⅛ to ⅜ of an inch.

20. A method comprising arranging first and second adhesives on opposite surfaces of a pad or strip, mounting a light permeable shied on an ocular lens in spaced relationship therewith relative to at least a major portion of the lens by installing the pad or strips between the lens and shield by use of the adhesives, the adhesive engaging the lens being weaker than the adhesive engaging the shield, the adhesive engaging the shield engaging it in relatively permanent manner.

21. A method as claimed in claim 20 wherein the adhesive engaging the lens contacts the lens over less than about twenty percent of the area of the same.

22. A method as claimed in claim 21, comprising repeated installations and removals of the shield with respect to the lens without the deposit of substantially any adhesive residues on the lens.

23. A method as claimed in claim 20 wherein the adhesive engaging the lens is applied solely to an upper peripheral portion of the lens.

24. A method as claimed in claim 20, wherein the shield is cantilevered on the lens.

25. A method as claimed in claim 24, wherein the shield is mounted so as to contact the lens at a position spaced from where the shield is supported on the lens and over a relatively limited area.

26. A method as claimed in claim 20, wherein the shield is made of a relatively rigid material capable of light interception.

* * * * *